United States Patent  (10) Patent No.: US 7,292,690 B2
Candelore et al.  (45) Date of Patent: Nov. 6, 2007

(54) VIDEO SCENE CHANGE DETECTION

(75) Inventors: Brant L. Candelore, Escondido, CA (US); Henry Derovanessian, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 786 days.

(21) Appl. No.: 10/274,019

(22) Filed: Oct. 18, 2002

(65) Prior Publication Data

US 2003/0152224 A1  Aug. 14, 2003

Related U.S. Application Data

(63) Continuation-in-part of application No. 10/038,217, filed on Jan. 2, 2002, and a continuation-in-part of application No. 10/038,032, filed on Jan. 2, 2002, and a continuation-in-part of application No. 10/037,914, filed on Jan. 2, 2002, and a continuation-in-part of application No. 10/037,499, filed on Jan. 2, 2002, and a continuation-in-part of application No. 10/037,498, filed on Jan. 2, 2002.

(60) Provisional application No. 60/409,675, filed on Sep. 9, 2002.

(51) Int. Cl.
  *H04N 7/167* (2006.01)
(52) U.S. Cl. .................... 380/210; 380/214; 380/200; 380/33
(58) Field of Classification Search ................ 380/210, 380/214, 200
  See application file for complete search history.

(56) References Cited

U.S. PATENT DOCUMENTS 3,852,519 A  12/1974 Court (Continued)

FOREIGN PATENT DOCUMENTS

EP  0674440  9/1995

(Continued)

OTHER PUBLICATIONS

Liu, et al. Motion Vector Encryption in Multimedia Streaming, 2004, IEEE, pp. 64-71.

(Continued)

*Primary Examiner*—Nasser Moazzami
*Assistant Examiner*—Fikremariam Yalew
(74) *Attorney, Agent, or Firm*—Miller Patent Services; Jerry A. Miller

(57) ABSTRACT

A selective encryption encoder consistent with certain embodiments of the invention has vertical and/or horizontal stripes encrypted. In one embodiment, packets are examined in the digital video signal to identify a specified packet type, the specified packet type being packets carrying data representing a video slice wherein the video slice contains a larger amount of data than a threshold (or a subsequent slice). The packets identified as being of the specified packet type are encrypted using a first encryption method to produce first encrypted packets. These first encrypted packets are then used to replace the unencrypted packets in the digital video signal to produce a partially encrypted video signal. The packets of the specified type can also be multiple encrypted and replaced in the data stream to produce a multiple encrypted video data stream.

35 Claims, 13 Drawing Sheets

U.S. PATENT DOCUMENTS

| | | |
|---|---|---|
| 4,712,238 A | 12/1987 | Gilhousen et al. |
| 4,739,510 A | 4/1988 | Jeffers et al. |
| 4,914,515 A | 4/1990 | Van Luyt |
| 4,944,006 A | 7/1990 | Citta et al. |
| 4,989,245 A | 1/1991 | Bennett |
| 4,995,080 A | 2/1991 | Bestler et al. |
| 5,018,197 A | 5/1991 | Jones et al. |
| 5,091,936 A | 2/1992 | Katznelson |
| 5,144,664 A | 9/1992 | Esserman et al. |
| 5,237,610 A | 8/1993 | Gammie et al. |
| 5,247,575 A | 9/1993 | Sprague et al. |
| 5,319,707 A | 6/1994 | Wasilewski et al. |
| 5,319,712 A | 6/1994 | Finkelstein et al. |
| 5,325,432 A | 6/1994 | Gardeck et al. |
| 5,341,425 A | 8/1994 | Wasilewski et al. |
| 5,381,481 A | 1/1995 | Gammie et al. |
| 5,400,401 A | 3/1995 | Wasilewski et al. |
| 5,420,866 A | 5/1995 | Wasilewski |
| 5,444,491 A | 8/1995 | Lim |
| 5,444,782 A | 8/1995 | Adams, Jr. et al. |
| 5,455,862 A | 10/1995 | Hoskinson |
| 5,491,748 A | 2/1996 | Auld, Jr. et al. |
| 5,535,276 A | 7/1996 | Ganesan |
| 5,539,823 A | 7/1996 | Martin |
| 5,553,141 A | 9/1996 | Lowry et al. |
| 5,555,305 A | 9/1996 | Robinson et al. |
| 5,561,713 A | 10/1996 | Suh |
| 5,583,863 A | 12/1996 | Darr, Jr. et al. |
| 5,590,202 A | 12/1996 | Bestler et al. |
| 5,600,721 A | 2/1997 | Kitazato |
| 5,629,981 A | 5/1997 | Nerlikar |
| 5,666,293 A | 9/1997 | Metz et al. |
| 5,699,429 A | 12/1997 | Tamer et al. |
| 5,726,711 A | 3/1998 | Boyce |
| 5,742,680 A | 4/1998 | Wilson |
| 5,742,681 A | 4/1998 | Giachetti et al. |
| 5,751,813 A | 5/1998 | Dorenbos |
| 5,754,650 A | 5/1998 | Katznelson |
| 5,754,658 A | 5/1998 | Aucsmith |
| 5,805,700 A | 9/1998 | Nardone et al. |
| 5,818,934 A | 10/1998 | Cuccia |
| 5,894,516 A | 4/1999 | Brandenburg |
| 5,915,018 A | 6/1999 | Aucsmith |
| 5,923,755 A | 7/1999 | Birch et al. |
| 5,930,361 A | 7/1999 | Hayashi et al. |
| 5,940,738 A | 8/1999 | Rao |
| 5,963,909 A | 10/1999 | Warren et al. |
| 5,973,722 A | 10/1999 | Wakai et al. |
| 5,999,622 A | 12/1999 | Yasukawa et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,026,164 A | 2/2000 | Sakamoto et al. |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,064,748 A | 5/2000 | Hogan |
| 6,070,245 A | 5/2000 | Murphy, Jr. et al. |
| 6,072,872 A | 6/2000 | Chang et al. |
| 6,072,873 A | 6/2000 | Bewick |
| 6,108,422 A | 8/2000 | Newby et al. |
| 6,115,821 A | 9/2000 | Newby et al. |
| 6,138,237 A | 10/2000 | Ruben et al. |
| 6,148,082 A | 11/2000 | Slattery et al. |
| 6,229,895 B1 | 5/2001 | Son et al. |
| 6,236,727 B1 | 5/2001 | Ciacelli et al. |
| 6,240,553 B1 | 5/2001 | Son et al. |
| 6,246,720 B1 * | 6/2001 | Kutner et al. .......... 375/240.25 |
| 6,292,568 B1 | 9/2001 | Akins, III et al. |
| 6,307,939 B1 | 10/2001 | Vigarie |
| 6,324,288 B1 | 11/2001 | Hoffman |
| 6,378,130 B1 | 4/2002 | Adams |
| 6,415,031 B1 | 7/2002 | Colligan et al. |
| 6,445,738 B1 | 9/2002 | Zdepski et al. |
| 6,449,718 B1 | 9/2002 | Rucklidge et al. |
| 6,453,115 B1 | 9/2002 | Boyle |
| 6,456,985 B1 | 9/2002 | Ohtsuka |
| 6,505,299 B1 | 1/2003 | Zeng et al. |
| 6,549,229 B1 | 4/2003 | Kirby et al. |
| 6,557,031 B1 | 4/2003 | Mimura et al. |
| 6,650,754 B2 | 11/2003 | Akiyama et al. |
| 6,654,389 B1 | 11/2003 | Brunheroto et al. |
| 6,684,250 B2 | 1/2004 | Anderson et al. |
| 6,697,944 B1 | 2/2004 | Jones et al. |
| 6,714,650 B1 | 3/2004 | Maillard et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,826,185 B1 | 11/2004 | Montanaro et al. |
| 6,891,565 B1 | 5/2005 | Dieterich |
| 6,895,128 B2 | 5/2005 | Bohnenkamp |
| 6,904,520 B1 | 6/2005 | Rosset et al. |
| 6,917,684 B1 | 7/2005 | Tatebayashi et al. |
| 6,938,162 B1 | 8/2005 | Nagai et al. |
| 6,976,166 B2 * | 12/2005 | Herley et al. ................ 713/165 |
| 7,039,938 B2 | 5/2006 | Candelore |
| 7,065,213 B2 | 6/2006 | Pinder |
| 7,127,619 B2 | 10/2006 | Unger et al. |
| 2001/0030959 A1 | 10/2001 | Ozawa et al. |
| 2001/0036271 A1 | 11/2001 | Javed |
| 2001/0051000 A1 | 12/2001 | Toshima |
| 2001/0051007 A1 | 12/2001 | Teshima |
| 2002/0003881 A1 | 1/2002 | Reitmeier et al. |
| 2002/0026587 A1 | 2/2002 | Talstra et al. |
| 2002/0047915 A1 | 4/2002 | Misu |
| 2002/0083317 A1 | 6/2002 | Ohta et al. |
| 2002/0083438 A1 | 6/2002 | So et al. |
| 2002/0097322 A1 | 7/2002 | Monroe et al. |
| 2002/0108035 A1 * | 8/2002 | Herley et al. ................ 713/165 |
| 2002/0116705 A1 | 8/2002 | Perlman et al. |
| 2002/0126890 A1 | 9/2002 | Katayama et al. |
| 2002/0129243 A1 | 9/2002 | Nanjundiah |
| 2002/0150239 A1 * | 10/2002 | Carny et al. ................... 380/37 |
| 2002/0164022 A1 | 11/2002 | Strasser et al. |
| 2002/0184506 A1 | 12/2002 | Perlman |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 * | 1/2003 | Ishtiaq et al. .......... 375/240.27 |
| 2003/0026423 A1 | 2/2003 | Unger et al. |
| 2003/0059047 A1 | 3/2003 | Iwamura |
| 2003/0072555 A1 | 4/2003 | Yap et al. |
| 2003/0077071 A1 | 4/2003 | Lin et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0126086 A1 | 7/2003 | Safadi |
| 2003/0140257 A1 | 7/2003 | Peterka et al. |
| 2003/0188154 A1 | 10/2003 | Dallard |
| 2003/0193973 A1 | 10/2003 | Takashimizu et al. |
| 2003/0204717 A1 | 10/2003 | Kuehnel |
| 2003/0228018 A1 | 12/2003 | Vince |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0049688 A1 | 3/2004 | Candelore |
| 2004/0068659 A1 | 4/2004 | Diehl |

| | | |
|---|---|---|
| 2004/0081333 A1 | 4/2004 | Grab et al. |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0193550 A1 | 9/2004 | Siegal |
| 2004/0240668 A1 | 12/2004 | Bonan et al. |
| 2004/0267602 A1 | 12/2004 | Gaydos et al. |
| 2005/0004875 A1 | 1/2005 | Kontio et al. |
| 2005/0066357 A1 | 3/2005 | Ryal |
| 2005/0071669 A1 | 3/2005 | Medvinsky et al. |
| 2005/0169473 A1 | 8/2005 | Candelore |
| 2005/0192904 A1 | 9/2005 | Candelore |
| 2005/0259813 A1 | 11/2005 | Wasilewski et al. |
| 2005/0265547 A1 | 12/2005 | Strasser et al. |
| 2006/0136976 A1 | 6/2006 | Coupe et al. |

FOREIGN PATENT DOCUMENTS

| | | |
|---|---|---|
| EP | 0674441 | 9/1995 |
| EP | 1 187 483 A2 | 3/2002 |
| WO | WO 94/10775 | 5/1994 |
| WO | WO 00/31964 | 6/2000 |
| WO | WO 01/65762 | 9/2001 |
| WO | WO 01/78386 A2 | 10/2001 |

OTHER PUBLICATIONS

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

ANONYMOUS, New Digital Copy Protection Proposal Would Secure Authorized Copies, PR Newswire, Nov. 1998, pp. 1-3.

ANONYMOUS, Message Authentication with Partial Encryption, Research disclosure RD 296086, Dec. 10, 1988.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

"How Networks Work—Milennium Edition"—pp. 88-89, Que Corporation, 2000.

* cited by examiner

| | | | | | |
|---|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

VIDEO SCENE CHANGE DETECTION

CROSS REFERENCE TO RELATED DOCUMENTS

This application is a continuation-in part of patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al, Ser. No. 10/037,498 all of which were filed on Jan. 2, 2002 and are hereby incorporated by reference herein.

This application is also related to and claims priority benefit of U.S. Provisional patent application Ser. No. 60/409,675 filed Sep. 9, 2002 to Candelore, et al. entitled "Generic PID Remapping for Content Replacement", Docket No. 50S5152, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, this invention relates to a encryption method and apparatus particularly useful for scrambling packetized video content such as that provided by cable and satellite television systems.

BACKGROUND OF THE INVENTION

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5 illustrates the slice structure of a frame of video data consistent with certain embodiments of the present invention.

DETAILED DESCRIPTION OF THE INVENTION

Figure 1:
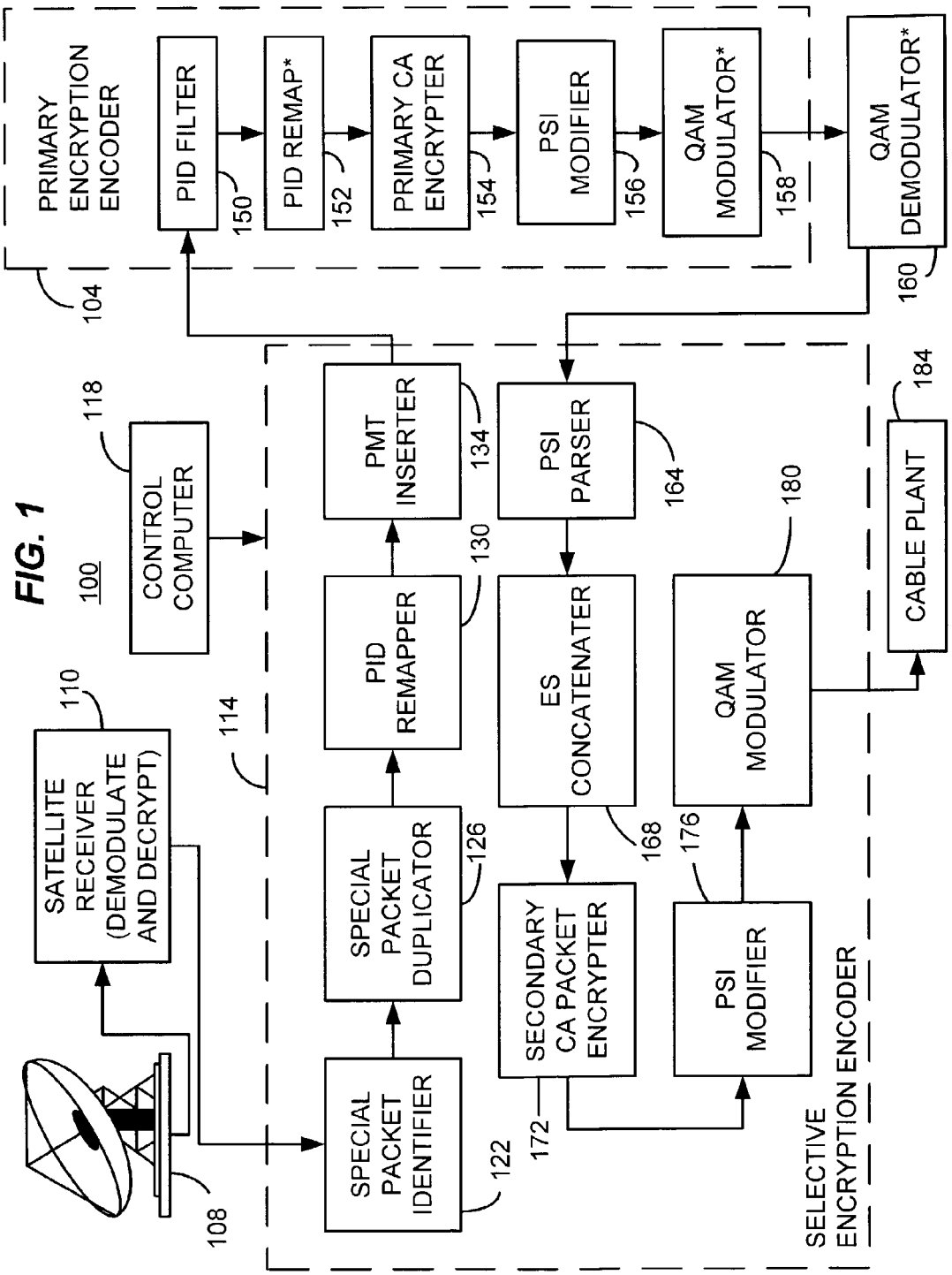
FIG. 1 is a block diagram of an exemplary cable system head end consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Turning now to FIG. 1, a head end 100 of a cable television system suitable for use in practicing a dual encryption embodiment of the present invention is illustrated. Those skilled in the art will appreciate that the present invention could also be implemented using more than two encryptions systems without departing from the present invention. The illustrated head end 100 implements the dual partial encryption scenario of the present invention by adapting the operation of a conventional encryption encoder 104 (such as those provided by Motorola, Inc. and Scientific-Atlanta, Inc., and referred to herein as the primary encryption encoder) with additional equipment.

Head end 100 receives scrambled content from one or more suppliers, for example, using a satellite dish antenna 108 that feeds a satellite receiver 110. Satellite receiver 110 operates to demodulate and descramble the incoming content and supplies the content as a stream of clear (unencrypted) data to a selective encryption encoder 114. The selective encryption encoder 114, according to certain embodiments, uses two passes or two stages of operation, to encode the stream of data. Encoder 114 utilizes a secondary conditional access system (and thus a second encryption method) in conjunction with the primary encryption encoder 104 which operates using a primary conditional access system (and thus a primary encryption method). A user selection provided via a user interface on a control computer 118 configures the selective encryption encoder 114 to operate in conjunction with either a Motorola or Scientific Atlanta cable network (or other cable or satellite network).

It is assumed, for purposes of the present embodiment of the invention, that the data from satellite receiver 110 is supplied as MPEG (Moving Pictures Expert Group) compliant packetized data. In the first stage of operation the data is passed through a Special Packet Identifier (PID) 122. Special Packet Identifier 122 identifies specific programming that is to be dual partially encrypted according to the present invention. The Special Packet Identifier 122 signals the Special Packet Duplicator 126 to duplicate special packets. The Packet Identifier (PID) Remapper 130, under control of the computer 118, remaps the PIDs of the elementary streams (ES) (i.e., audio, video, etc.) of the programming that shall remain clear and the duplicated packets to new PID values. The payload of the elementary stream packets are not altered in any way by Special Packet Identifier 122, Special Packet Duplicator 126, or PID remapper 130. This is done so that the primary encryption encoder 104 will not recognize the clear unencrypted content as content that is to be encrypted.

Figure 2:
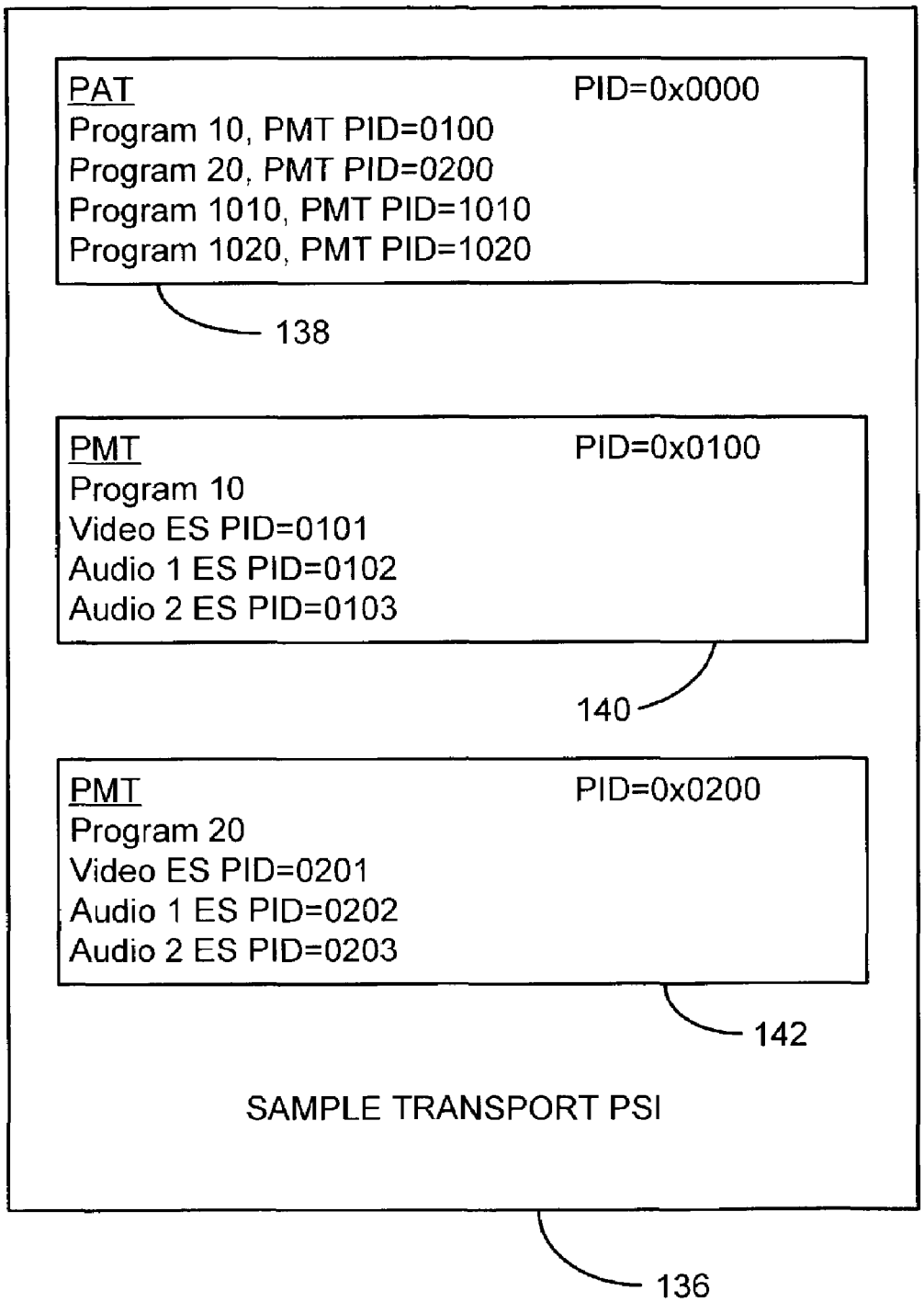
FIG. 2 is an illustration of sample transport stream PSI consistent with certain embodiments of the present invention.

The packets may be selected by the special packet identifier 122 according to one of the selection criteria described in the above-referenced applications or may use another selection criteria such as those which will be described later herein. Once these packets are identified in the packet identifier 122, packet duplicator 126 creates two copies of the packet. The first copy is identified with the original PID so that the primary encryption encoder 104 will recognize that it is to be encrypted. The second copy is identified with a new and unused PID, called a "secondary PID" (or shadow PID) by the PID Remapper 130. This secondary PID will be used later by the selective encryption encoder 114 to determine which packets are to be encrypted according to the secondary encryption method. FIG. 2 illustrates an exemplary set of transport PSI tables 136 after this remapping with a PAT 138 defining two programs (10 and 20) with respective PID values 0100 and 0200. A first PMT 140 defines a PID=0101 for the video elementary stream and PIDs 0102 and 0103 for two audio streams for program 10. Similarly, a second PMT 142 defines a PI=0201 for the video elementary stream and PIDs 0202 and 0203 for two audio streams for program 20.

As previously noted, the two primary commercial providers of cable head end encryption and modulation equipment are (at this writing) Motorola, Inc. and Scientific-Atlanta, Inc. While similar in operation, there are significant differences that should be discussed before proceeding since the present selective encryption encoder 114 is desirably compatible with either system. In the case of Motorola equipment, the Integrated Receiver Transcoder (IRT), an unmodulated output is available and therefore there is no need to demodulate the output before returning a signal to the selective encryption encoder 114, whereas no such unmodulated output is available in a Scientific-Atlanta device. Also, in the case of current Scientific-Atlanta equipment, the QAM, the primary encryption encoder carries out a PID remapping function on received packets. Thus, provisions are made in the selective encryption encoder 114 to address this remapping.

In addition to the above processing, the Program Specific Information (PSI) is also modified to reflect this processing. The original, incoming Program Association Table (PAT) is appended with additional Program Map Table (PMT) entries at a PMT inserter 134. Each added PMT entry contains the new, additional streams (remapped & shadow PIDs) created as part of the selective encryption (SE) encoding process for a corresponding stream in a PMT of the incoming transport. These new PMT entries will mirror their corresponding original PMTs. The program numbers will be automatically assigned by the selective encryption encoder 114 based upon open, available program numbers as observed from the program number usage in the incoming stream. The selective encryption System 114 system displays the inserted program information (program numbers, etc) on the configuration user interface of control computer 118 so that the Multiple System Operator (MSO, e.g., the cable system operator) can add these extra programs into the System Information (SI) control system and instruct the system to carry these programs in the clear.

Figure 3:
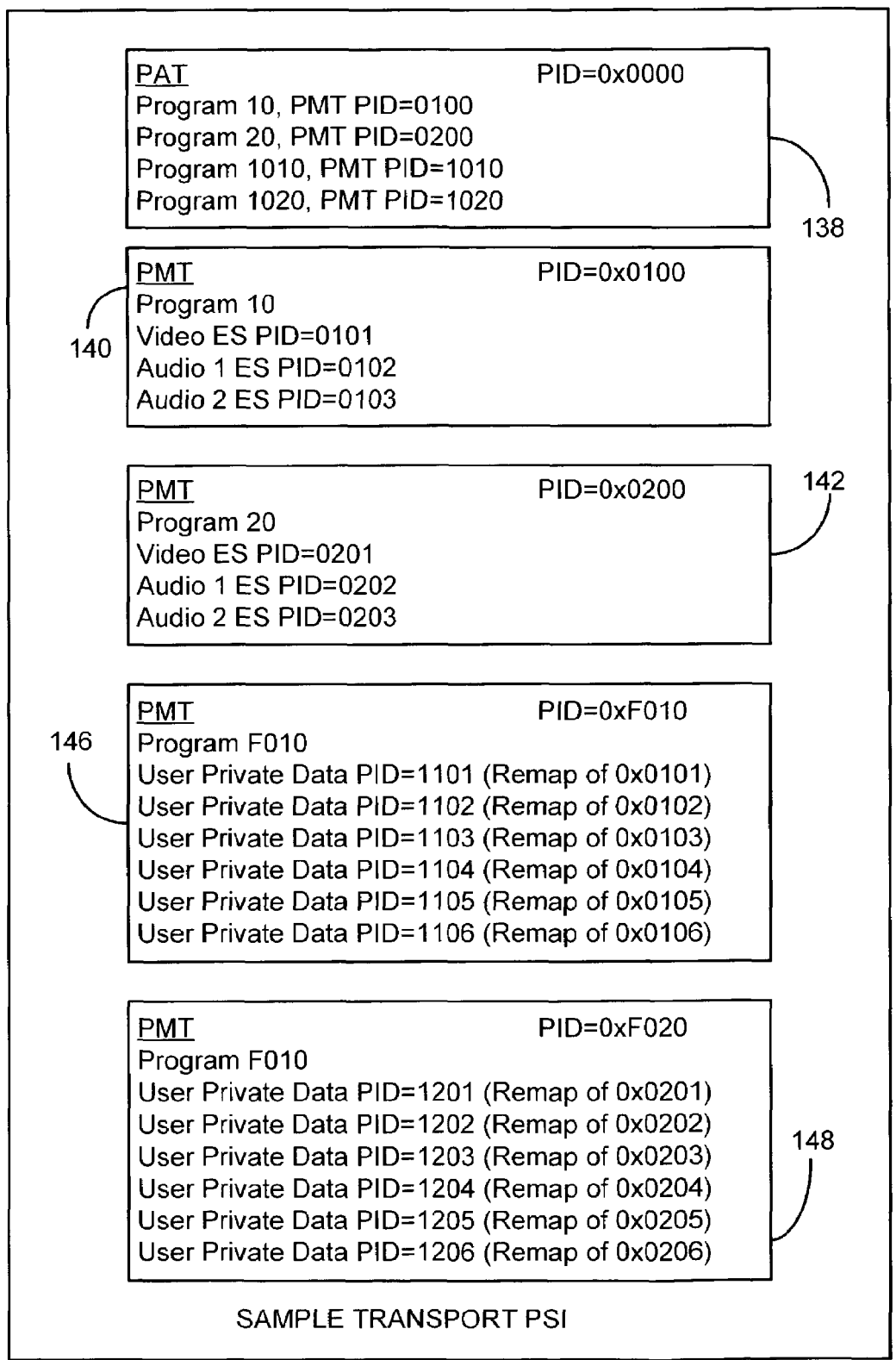
FIG. 3 is a further illustration of sample transport stream PSI consistent with certain embodiments of the present invention.

The modified transport PSI is illustrated as 144 in FIG. 3 with two additional temporary PMTs 146 and 148 appended to the tables of transport PSI 136. The appended PMTs 146 and 148 are temporary. They are used for the primary encryption process and are removed in the second pass of processing by the secondary encryption encoder. In accordance with the MPEG standard, all entries in the temporary PMTs are marked with stream type "user private" with an identifier of 0xF0. These PMTs describe the remapping of the PIDs for use in later recovery of the original mapping of the PIDs in the case of a PID remapping in the Scientific-Atlanta equipment. Of course, other identifiers could be used without departing from the present invention.

In order to assure that the Scientific-Atlanta PID remapping issue is addressed, if the selective encryption encoder 114 is configured to operate with a Scientific-Atlanta system, the encoder adds a user private data descriptor to each elementary stream found in the original PMTs in the incoming data transport stream (TS) per the format below (of course, other formats may also be suitable):

| Syntax | value | # of bits |
|---|---|---|
| private_data_indicator_descriptor( ) { | | |
| descriptor_tag | 0xF0 | 8 |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The selective encryption encoder 114 of the current embodiment also adds a user private data descriptor to each elementary stream placed in the temporary PMTs created as described above per the format below:

| Syntax | value | # of bits |
|---|---|---|
| private_data_indicator_descriptor( ) { | | |
| descriptor_tag | 0xF0 | 8 |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The "????" in the tables above is the value of the "orig_pid" which is a variable while the "??" is a "stream_type" value. The data field for "orig_pid" is a variable that contains the original incoming PID or in the case of remap or shadow PIDs, the original PID that this stream was associated with. The data field "stream_type" is a variable that describes the purpose of the stream based upon the chart below:

| Stream Type | Value |
|---|---|
| Legacy ES | 0x00 |
| Remapped ES | 0x01 |
| Shadow ES | 0x02 |
| Reserved | 0x03-0xFF |

These descriptors will be used later to re-associate the legacy elementary streams, which are encrypted by the Scientific-Atlanta, Inc. primary encryption encoder 104, with the corresponding shadow and remapped clear streams after PID remapping in the Scientific-Atlanta, Inc. modulator prior to the second phase of processing of the Selective Encryption Encoder. Those skilled in the art will appreciate that the above specific values should be considered exemplary and other specific values could be used without departing from the present invention.

In the case of a Motorola cable system being selected in the selective encryption encoder configuration GUI, the original PAT and PMTs can remain unmodified, providing the system does not remap PIDs within the primary encryption encoder. The asterisks in FIG. 1 indicate functional blocks that are not used in a Motorola cable system.

The data stream from selective encryption encoder 114 is passed along to the input of the primary encryption encoder 104 which first carries out a PID filtering process at 150 to identify packets that are to be encrypted. At 152, in the case of a Scientific-Atlanta device, a PID remapping may be carried out. The data are then passed along to an encrypter 154 that, based upon the PID of the packets encrypts certain packets (in accord with the present invention, these packets are the special packets which are mapped by the packet remapper 130 to the original PID of the incoming data stream for the current program). The remaining packets are unencrypted. The data then passes through a PSI modifier 156 that modifies the PSI data to reflect changes made at the PID remapper. The data stream is then modulated by a quadrature amplitude modulation (QAM) modulator 158 (in the case of the Scientific-Atlanta device) and passed to the output thereof. This modulated signal is then demodulated by a QAM demodulator 160. The output of the demodulator 160 is directed back to the selective encryption encoder 114 to a PSI parser 164.

The second phase of processing of the transport stream for selective encryption is to recover the stream after the legacy encryption process is carried out in the primary encryption encoder 104. The incoming Program Specific Information (PSI) is parsed at 164 to determine the PIDs of the individual elementary streams and their function for each program, based upon the descriptors attached in the first phase of processing. This allows for the possibility of PID remapping, as seen in Scientific-Atlanta primary encryption encoders. The elementary streams described in the original program PMTs are located at PSI parser 164 where these streams have been reduced to just the selected packets of interest and encrypted in the legacy CA system format in accord with the primary encryption method at encoder 104. The elementary streams in the temporary programs appended to the original PSI are also recovered at elementary stream concatenator 168. The packets in the legacy streams are appended to the remapped content, which is again remapped back to the PID of the legacy streams, completing the partial, selective encryption of the original elementary streams.

The temporary PMTs and the associated PAT entries are discarded and removed from the PSI. The user private data descriptors added in the first phase of processing are also removed from the remaining original program PMTs in the PSI. For a Motorola system, no PMT or PAT reprocessing is required and only the final secondary encryption of the transport stream occurs.

During the second phase of processing, the SE encoder 114 creates a shadow PSI structure that parallels the original MPEG PSI, for example, having a PAT origin at PID 0x0000. The shadow PAT will be located at a PID specified in the SE encoder configuration as indicated by the MSO from the user interface. The shadow PMT PIDs will be automatically assigned by the SE encoder 114 dynamically, based upon open, available PID locations as observed from PID usage of the incoming stream. The PMTs are duplicates of the original PMTs, but also have CA descriptors added to the entire PMT or to the elementary streams referenced within to indicate the standard CA parameters and optionally, shadow PID and the intended operation upon the associated elementary stream. The CA descriptor can appear in the descriptor1( ) or descriptor2( ) loops of the shadow PMT. If found in descriptor1( ) the CA_PID called out in the CA descriptor contains the non-legacy ECM PID which would apply to an entire program. Alternatively, the ECM PID may be sent in descriptor2( ). The CA descriptor should not reference the selective encryption elementary PID in the descriptor1( ) area.

| CA PID Definition | Secondary CA_private_data Value |
|---|---|
| ECM PID | 0x00 |
| Replacement PID | 0x01 |
| Insertion PID | 0x02 |
| ECM PID | undefined (default) |

This shadow PSI insertion occurs regardless of whether the selective encryption operation is for a Motorola or Scientific Atlanta cable network. The elementary streams containing the duplicated packets of interest that were also assigned to the temporary PMTs are encrypted during this second phase of operation at secondary packet encrypter in the secondary CA format based upon the configuration data of the CA system attached using the DVB (Digital Video Broadcasting) Simulcrypt™ standard.

The data stream including the clear data, primary encrypted data, secondary encrypted data and other information are then passed to a PSI modifier 176 that modifies the transport PSI information by deletion of the temporary PMT tables and incorporation of remapping as described above. The output of the PSI modifier 176 is modulated at a QAM modulator 180 and delivered to the cable plant 184 for distribution to the cable system's customers.

Figure 4:
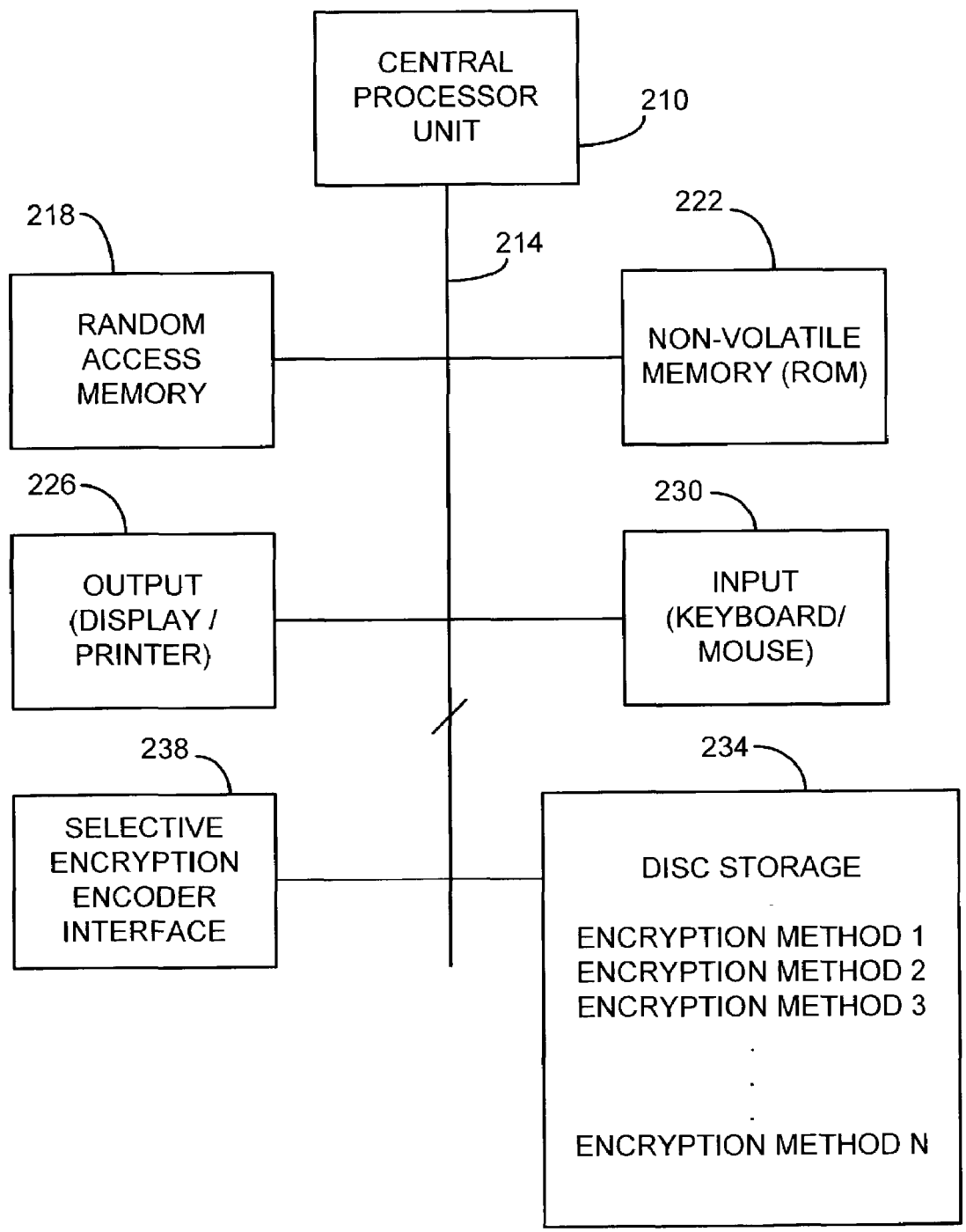
FIG. 4 is a block diagram of an illustrative control processor 100 consistent with certain embodiments of the present invention.

The control processor 100 may be a personal computer based device that is used to control the selective encryption encoder as described herein. An exemplary personal computer based controller 100 is depicted in FIG. 4. Control processor 100 has a central processor unit (CPU) 210 with an associated bus 214 used to connect the central processor unit 210 to Random Access Memory 218 and Non-Volatile Memory 222 in a known manner. An output mechanism at 226, such as a display and possibly printer, is provided in order to display and/or print output for the computer user as well as to provide a user interface such as a Graphical User Interface (GUI). Similarly, input devices such as keyboard and mouse 230 may be provided for the input of information by the user at the MSO. Computer 100 also may have disc storage 234 for storing large amounts of information including, but not limited to, program files and data files. Computer system 100 also has an interface 238 for connection to the selective encryption encoder 114. Disc storage 234 can store any number of encryption methods that can be downloaded as desired by the MSO to vary the encryption on a regular basis to thwart hackers. Moreover, the encryption methods can be varied according to other criteria such as availability of bandwidth and required level of security.

The partial encryption process described above utilizes any suitable conditional access encryption method at encrypters 154 and 172. However, these encryption techniques are selectively applied to the data stream using a technique such as those described below or in the above-referenced patent applications. In general, but without the intent to be limiting, the selective encryption process utilizes intelligent selection of information to encrypt so that the entire program does not have to undergo dual encryption. By appropriate selection of appropriate data to encrypt, the program material can be effectively scrambled and hidden from those who desire to hack into the system and illegally recover commercial content without paying. The MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data.

In accordance with certain embodiments of the present invention, a method of dual encrypting a digital video signal involves examining unencrypted packets of data in the digital video signal to identify at least one specified packet type, the specified packet type comprising packets of data as will be described hereinafter; encrypting packets identified as being of the specified packet type using a first encryption method to produce first encrypted packets; encrypting the packets identified as being of the specified packet type using a second encryption method to produce second encrypted packets; and replacing the unencrypted packets of the specified packet type with the first encrypted packets and the second encrypted packets in the digital video signal to produce a partially dual encrypted video signal.

The MPEG specification defines a slice as ". . . a series of an arbitrary number of consecutive macroblocks. The first and last macroblocks of a slice shall not be skipped macroblocks. Every slice shall contain at least one macroblock. Slices shall not overlap. The position of slices may change from picture to picture. The first and last macroblock of a slice shall be in the same horizontal row of macroblocks. Slices shall occur in the bitstream in the order in which they are encountered, starting at the upper-left of the picture and proceeding by raster-scan order from left to right and top to bottom . . . ."

By way of example, to represent an entire frame of NTSC information, for standard resolution, the frame (picture) is divided into 30 slices (but in general j slices may make up a full frame). Each slice contains 33 variable length macroblocks (but in general can include k variable length macroblocks) of information representing a 16×16 pixel region of the image. This is illustrated as standard definition frame 250 of FIG. 5 with each slice starting with a slice header (SH1-SH30) and each slice having 33 macroblocks (MB1-MB33). By appropriate selection of particular data representing the frame, the image can be scrambled beyond recognition in a number of ways as will be described below. By variation of the selection criteria for selective encryption, hackers can be thwarted on a continuing basis. Moreover, the selection criteria can be changed to adapt to bandwidth requirements as well as need for security of particular content (or other criteria).

Scene Change Detection

In accordance with one embodiment consistent with the invention referred to herein as "scene change detection encryption", scene changes are used as a criterion for selection of data to be encrypted. Whenever a scene change takes place in a digital video signal (e.g., an MPEG digital video signal), there is generally an inability to rely upon prior anchor data such as absolute luminance and chrominance data that is generally transmitted in I Frames or P Frames. Essentially, a new starting point image is created for the image. From this starting point, high degrees of compression can be obtained by use of motion vectors to describe movement of the images. The starting point image is essentially a first frame of the scene change and contains large amounts of intra-coded data. As previously described, this data is coded as intra-coded macroblocks within the slices of video data (video slices).

Thus, during a scene change, the MPEG encoder sends intra-coded information (containing absolute luminance and chrominance information). Ordinarily, the encoder attempts to send this data in an I Frame or I slices (for a progressive refresh P Frame). However, the timing of a scene change may dictate that the encoder must encode this data in other frames and other slices. The data can be sent in either of two ways, either as intra-coded macroblocks or as motion vector macroblocks with luminance and chrominance error correction data (called macroblock pattern). In either case, the amount of data will generally significantly exceed the norm (although, in general, the amount of data needed to encode luminance and chrominance data is more than that needed to encode motion vector information).

The first frame of a scene change thus generally contains large amounts of intra-coded data compared with the data required to define a change in the image from frame to frame when a scene change is not taking place. This fact provides a basis for detection of a scene change. By establishment of a threshold, it can be defined that a scene change, for purposes of this invention, takes place whenever the amount of data in a particular frame or slice exceeds this prescribed threshold. The threshold can, in this example, correspond to a number of bits or bytes making up a particular slice (or frame or other suitable segment of the image) of data. In one exemplary embodiment, using a 3 Mbps test stream, it is noted that a slice of standard definition video data generally carries between about 376 and 752 bits of video data. By observation of the amount of data that constitutes a scene change, a threshold of approximately 1316 bits, which is 1½ to 3 times the nominal size, can be established empirically and refined. The size of the slices will vary with the stream bit rate and nature of the content. For example, whether there are a lot of hard cuts or action scenes in the video. Thus any absolute bit size cannot be conclusive of a scene change. However, in one example consistent with certain embodiments of the present invention, a rule could be made that if the slice size were 1½ to 3 times the size of previous slices, then a scene change is occurring. Thus, it can be deemed that any slice carrying more than this threshold contains data representing a scene change. This slice, and/or the following slice (to capture additional scene change information carried in a subsequent slice) can be encrypted to provide partial encryption of the video image.

When a decoder (such as one incorporated within special packet identifier 122) receives the MPEG encoded digital video stream, it can therefore use the size of a data slice as an indication of a scene change. If the decoder is able to buffer one or more slices of the video data stream, each slice exceeding the threshold in size can be encrypted in accordance with certain embodiments of the present invention. However, in the event such buffering is not available, it can be assumed that a scene change will involve multiple sequential slices of video data. Thus, if a slice exceeds the size threshold, it can reasonably be assumed that the next slice will also contain a portion of the scene change. Thus, if inadequate buffering is available to permit encryption of the current slice of video data (which exceeds the threshold in size), the following slice can be encrypted to capture additional scene change information carried in a subsequent slice to provide partial encryption of the video image. Ideally, of course, all slices involved with the scene change will be encrypted.

Figure 6:
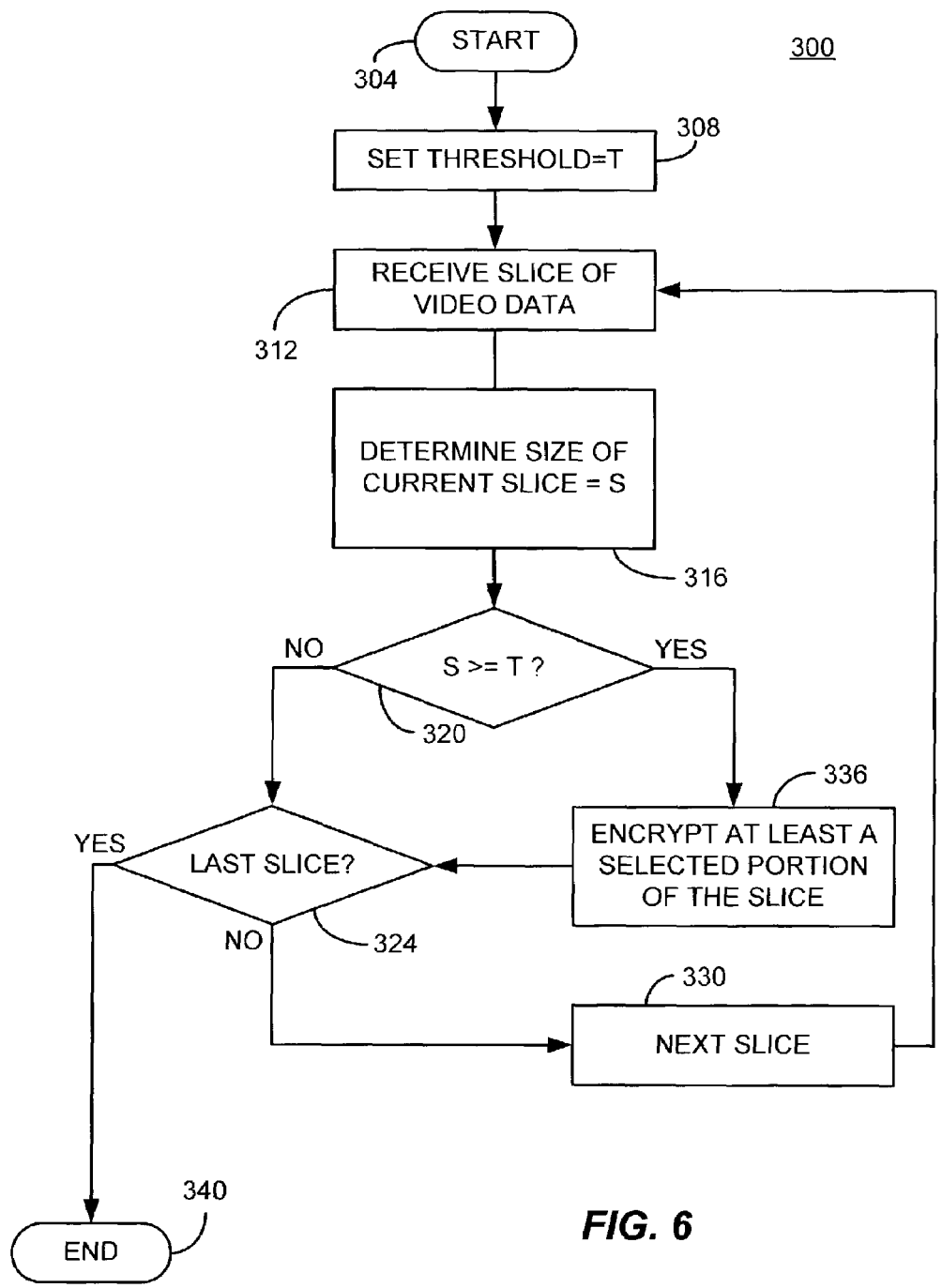
FIG. 6 is a flow chart depicting a slice size based scene change detection process used in conjunction with an encryption process consistent with certain embodiments of the present invention.

This process is depicted as process 300 of FIG. 6 starting at 304. At 308 a threshold T is established as a threshold beyond which a scene change is deemed to have occurred. At 312 a slice of video data is received and its size S is determined at 316. If the slice of video data is not larger in size than the threshold at 320, and if it is not the last slice in an image at 324, the process increments to the next slice at 330 and control returns to 312 where the slice is retrieved. If the slice size S is greater than or equal to the threshold (or alternatively, simply greater than the threshold) at 320, at least a portion of the slice (e.g., the slice header or all intra-coded data in the slice or the entire slice) is encrypted at 336. The process then proceeds to 324. When the last slice of the video signal has been processed, process 300 ends at 340.

Figure 7:
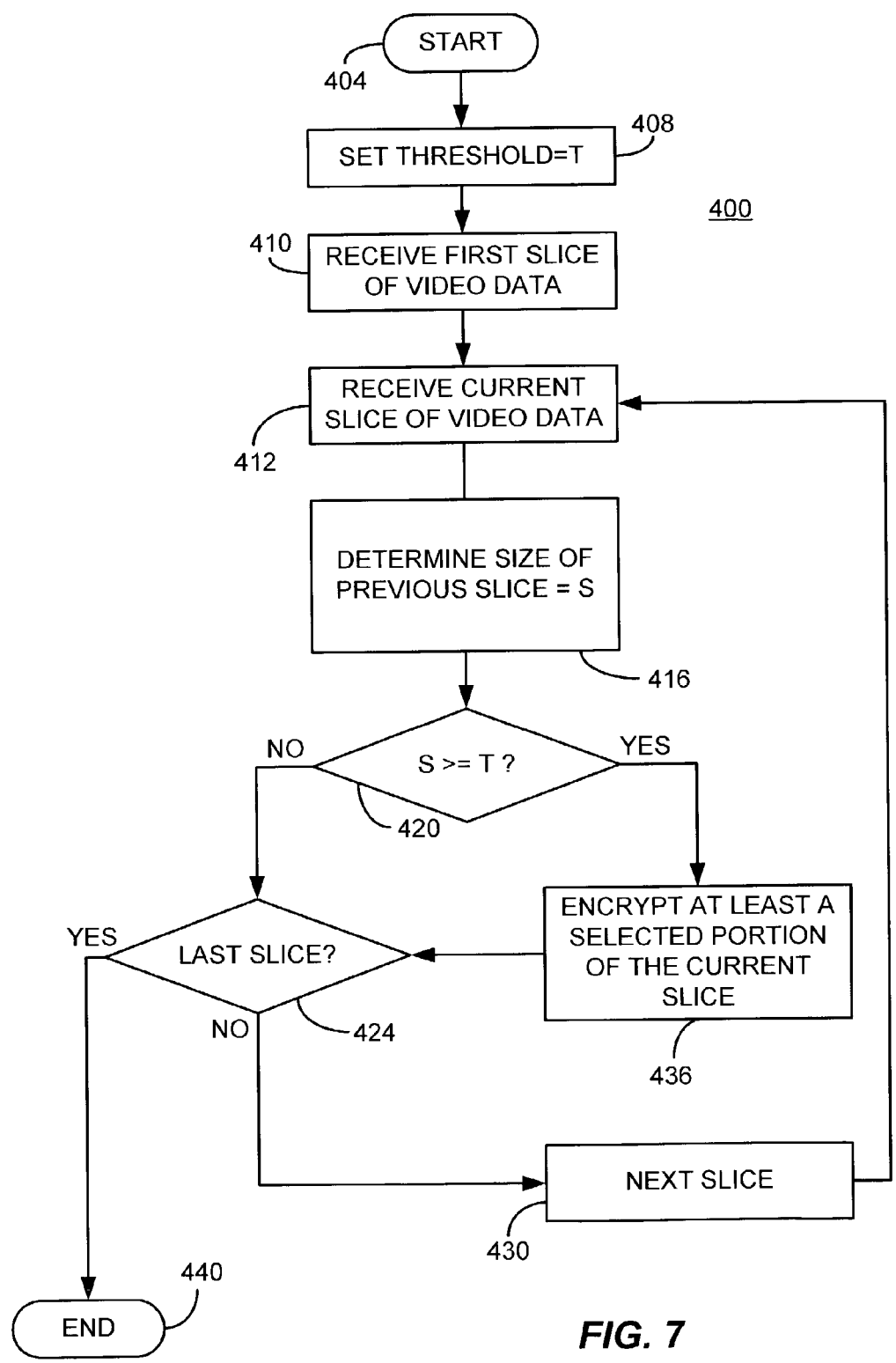
FIG. 7 is a flow chart depicting another slice size based scene change detection process used in conjunction with an encryption process consistent with certain embodiments of the present invention.

In a similar manner, a process wherein a previous slice is used to determine whether or not to encrypt a current slice is depicted as process 400 of FIG. 7 starting at 404. At 408 a threshold T is established as a threshold beyond which a scene change is deemed to have occurred. A first slice is received at 410 and a current slice of video data is received at 412. The size S of the slice prior to the current slice is determined at 416. If the prior slice of video data is not larger in size than the threshold at 420, and if it is not the last slice in an image at 424, the process increments to the next slice at 430 and control returns to 412 where a new current slice is retrieved. If the slice size S of the prior slice is greater than or equal to the threshold (or alternatively, simply greater than the threshold) at 420, at least a portion of the current slice (e.g., the slice header or all intra-coded data in the slice or the entire slice) is encrypted at 436. The process then proceeds to 424. When the last slice of the video signal has been processed, process 400 ends at 440.

Those skilled in the art will also appreciate that the processes 300 and 400 can be combined so that both the current slice and the prior slice are encrypted if the prior slice is greater in size than the threshold. The slices can be encrypted in any suitable manner including, but not limited to, encryption of the entire slice, encryption of slice headers for the slice or encryption of all intra-coded macroblocks in the slice, without limitation.

Figure 8:
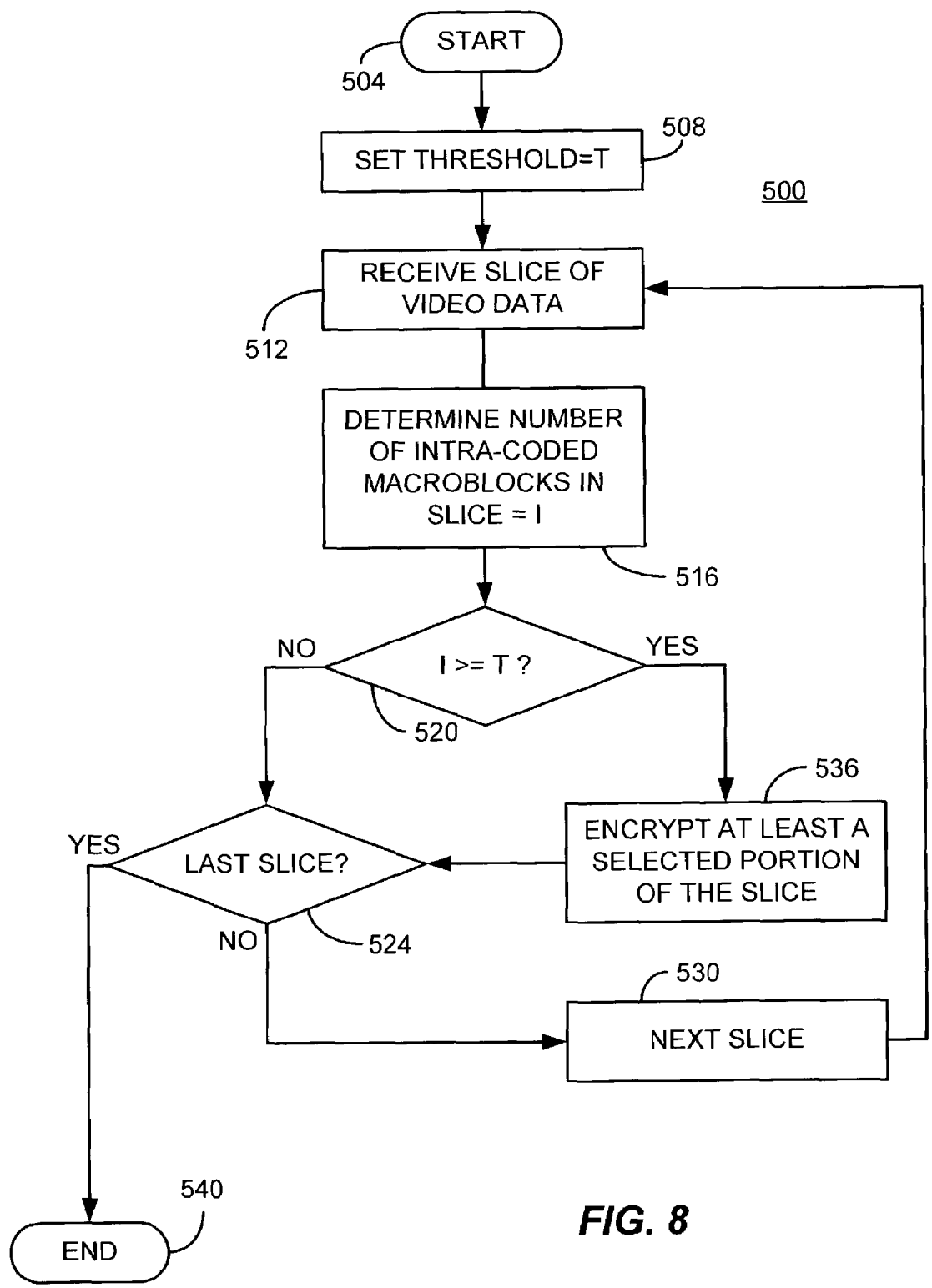
FIG. 8 is a flow chart depicting an intra-coded macroblock count based scene change detection process used in conjunction with an encryption process consistent with certain embodiments of the present invention.

In addition to measuring the size of a slice (or frame or other portion of the image) by number of packets or bytes or bits, the size of the slice can be judged in other ways. For example, the number size of a slice at a scene change is related to the number of intra-coded macroblocks contained in the slice. Thus, in another embodiment consistent with the present invention (which can be viewed as a subset of the first embodiment), the size of a slice can be judged by the number of macroblocks containing intra-coded data within the slice. This process is depicted as process 500 of FIG. 8 starting at 504. At 508 a threshold T number of intra-coded macroblocks is established as a threshold beyond which a scene change is deemed to have occurred. At 512 a slice of video data is received and its size I (in terms of number of intra-coded macroblocks) is determined at 516. If the slice of video data contains fewer intra-coded macroblocks than the threshold T at 520, and if it is not the last slice in an image at 524, the process increments to the next slice at 530 and control returns to 512 where the slice is retrieved. If the number of intra-coded macroblocks I is greater than or equal to the threshold T (or alternatively, simply greater than the threshold) at 520, at least a portion of the slice (e.g., the slice header or all intra-coded data in the slice or the entire slice) is encrypted at 536. The process then proceeds to 524. When the last slice of the video signal has been processed, process 500 ends at 540.

Figure 9:
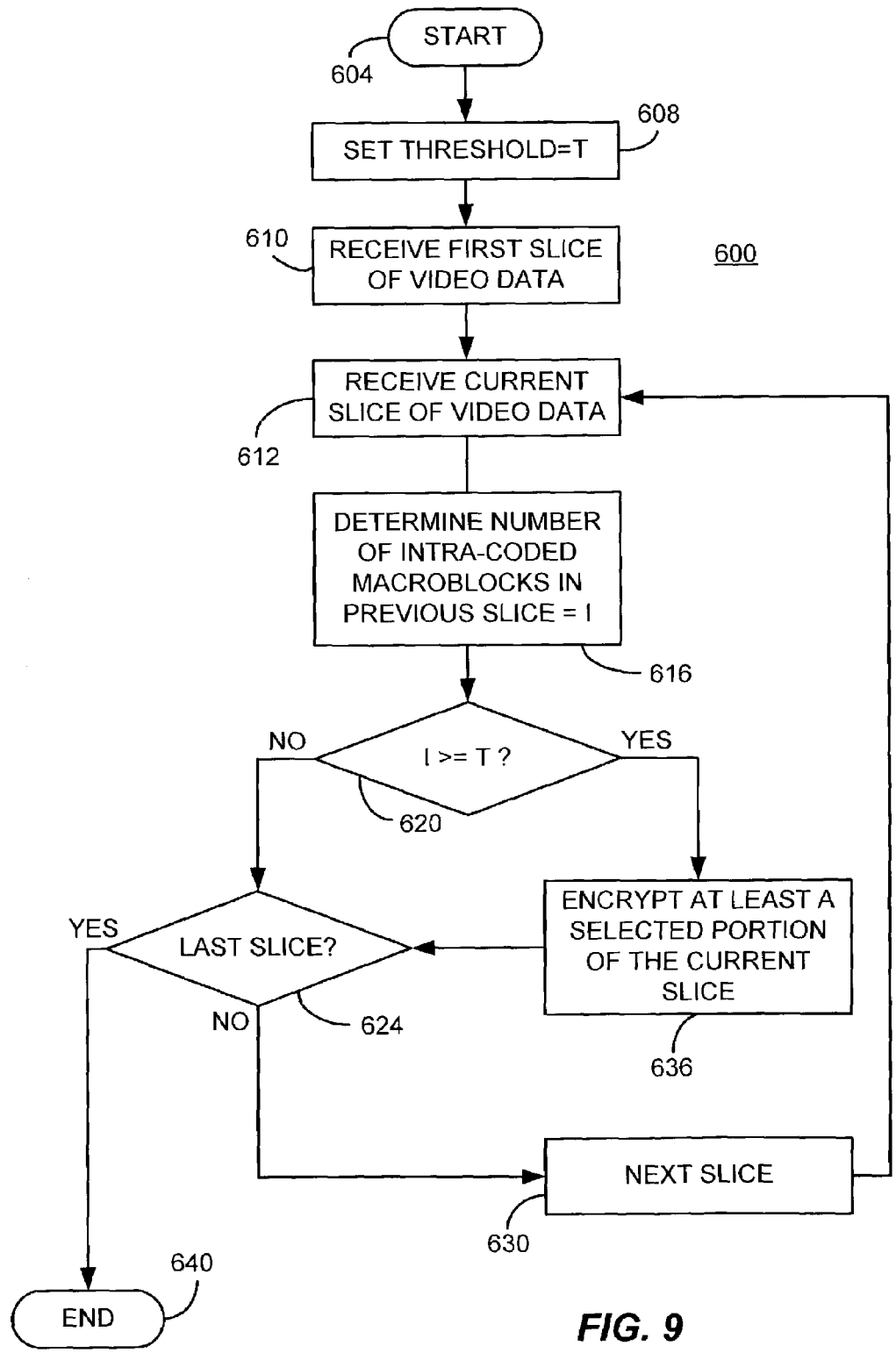
FIG. 9 is a flow chart depicting another intra-coded macroblock count based scene change detection process used in conjunction with an encryption process consistent with certain embodiments of the present invention.

In a similar manner, a process wherein a previous slice is used to determine whether or not to encrypt a current slice is depicted as process 600 of FIG. 9 starting at 604. At 608 a threshold T (number of intra-coded macroblocks) is established as a threshold beyond which a scene change is deemed to have occurred. A first slice is received at 610 and a current slice of video data is received at 612. The size S of the slice prior to the current slice is determined (in number of intra-coded macroblocks) at 616. If the prior slice of video data is not larger in size than the threshold at 620 (as measured in number of intra-coded macroblocks), and if it is not the last slice in an image at 624, the process increments to the next slice at 630 and control returns to 612 where a new current slice is retrieved. If the number of intra-coded macroblocks I of the prior slice is greater than or equal to the threshold T (or alternatively, simply greater than the threshold) at 620, at least a portion of the current slice (e.g., the slice header or all intra-coded data in the slice or the entire slice) is encrypted at 636. The process then proceeds to 624. When the last slice of the video signal has been processed, process 600 ends at 640.

In one exemplary embodiment, it is noted that a P frame slice of standard definition video data generally carries between about 2 and 4 intra-coded macroblocks of video data (out of 33 macroblocks). This varies greatly. By observation of the amount of data that constitutes a scene change, a threshold of approximately 15 intra-coded macroblocks can be established empirically and refined. The threshold value is somewhat subjective. It can depend on the encoder. It can also partly depend on whether or not any scenes detections can be missed. There are major and minor scene changes. It is possible that only major scene changes need be detected. Thus, it can be deemed that any slice carrying more than this threshold contains data representing a scene change. This slice, and/or the following slice can be encrypted to provide partial encryption of the video image.

Those skilled in the art will also appreciate that the processes 500 and 600 can be combined so that both the current slice and the prior slice are encrypted if the prior slice is greater in size than the threshold. The slices can be encrypted in any suitable manner including, but not limited to, encryption of the entire slice, encryption of slice headers for the slice or encryption of all intra-coded macroblocks in the slice, without limitation.

Figure 10:
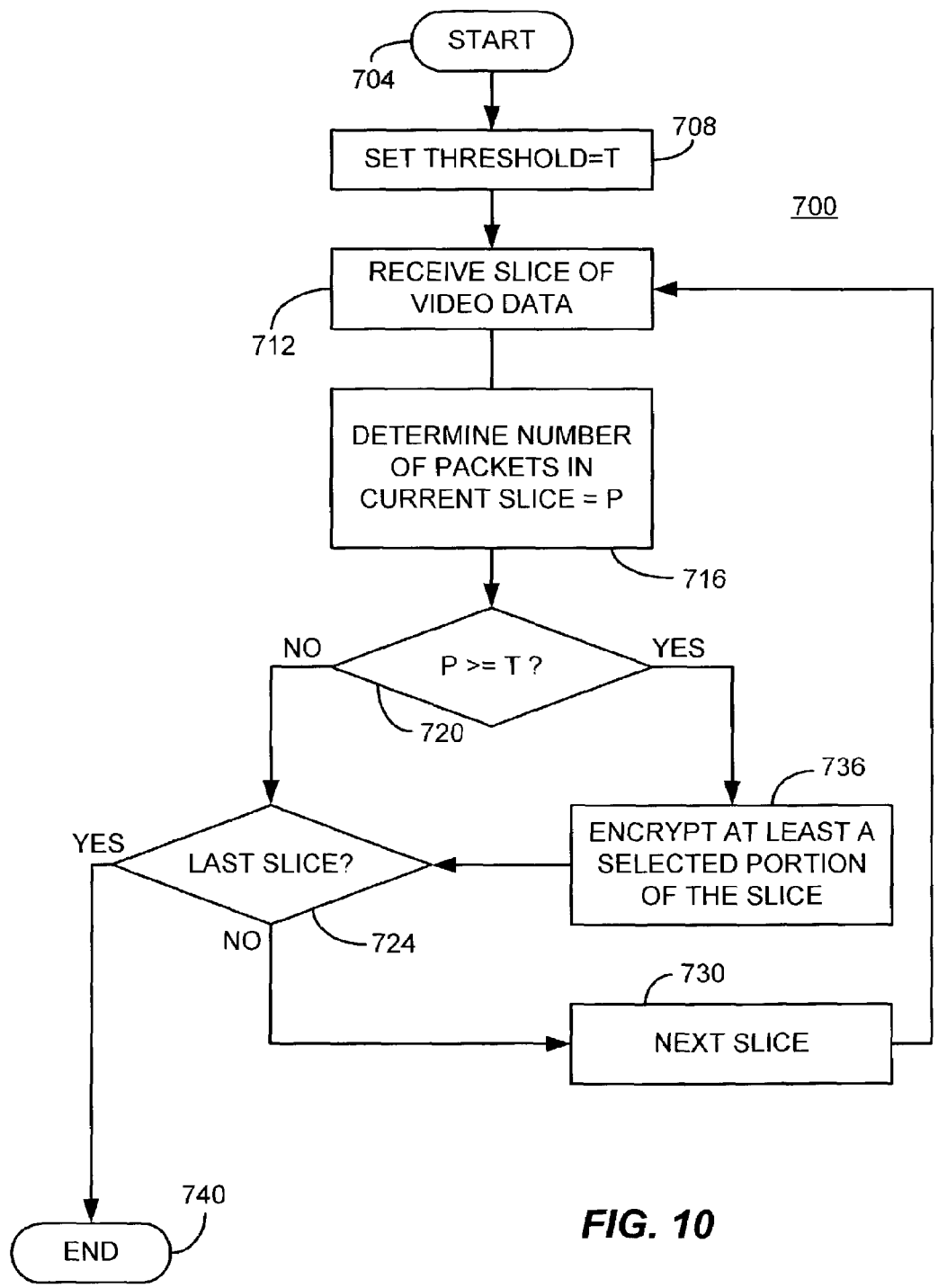
FIG. 10 is a flow chart depicting a packet count based scene change detection process used in conjunction with an encryption process consistent with certain embodiments of the present invention.

In another embodiment, consistent with embodiments of the present invention, the size of a slice of video can be measured in terms of the number of packets required to carry the slice's data. Recall that the macroblocks of data forming a slice are variable in size. However, in most commercial embodiments, the transport stream carrying the macroblocks of data is carried using fixed size packets. These fixed size packets, thus, will vary in number depending upon the amount of data in a particular slice of video. Therefore, the size of the video slice can be gauged by the number of packets used to carry the slice of data. Accordingly, a process 700 is depicted in FIG. 10 starting at 704 in which the number of packets is used as a measure of the size of the video slice. At 708 a threshold T number of packets is established as a threshold beyond which a scene change is deemed to have occurred. At 712 a slice of video data is received and its size P in number of packets is determined at 716. If the slice of video data is not larger in size than the threshold T at 720 (measured in number of packets), and if it is not the last slice in an image at 724, the process increments to the next slice at 730 and control returns to 712 where the slice is retrieved. If the number of packets P is greater than or equal to the threshold (or alternatively, simply greater than the threshold) at 720, at least a portion of the slice (e.g., the slice header or all intra-coded data in the slice or the entire slice) is encrypted at 736. The process then proceeds to 724. When the last slice of the video signal has been processed, process 700 ends at 740.

Figure 11:
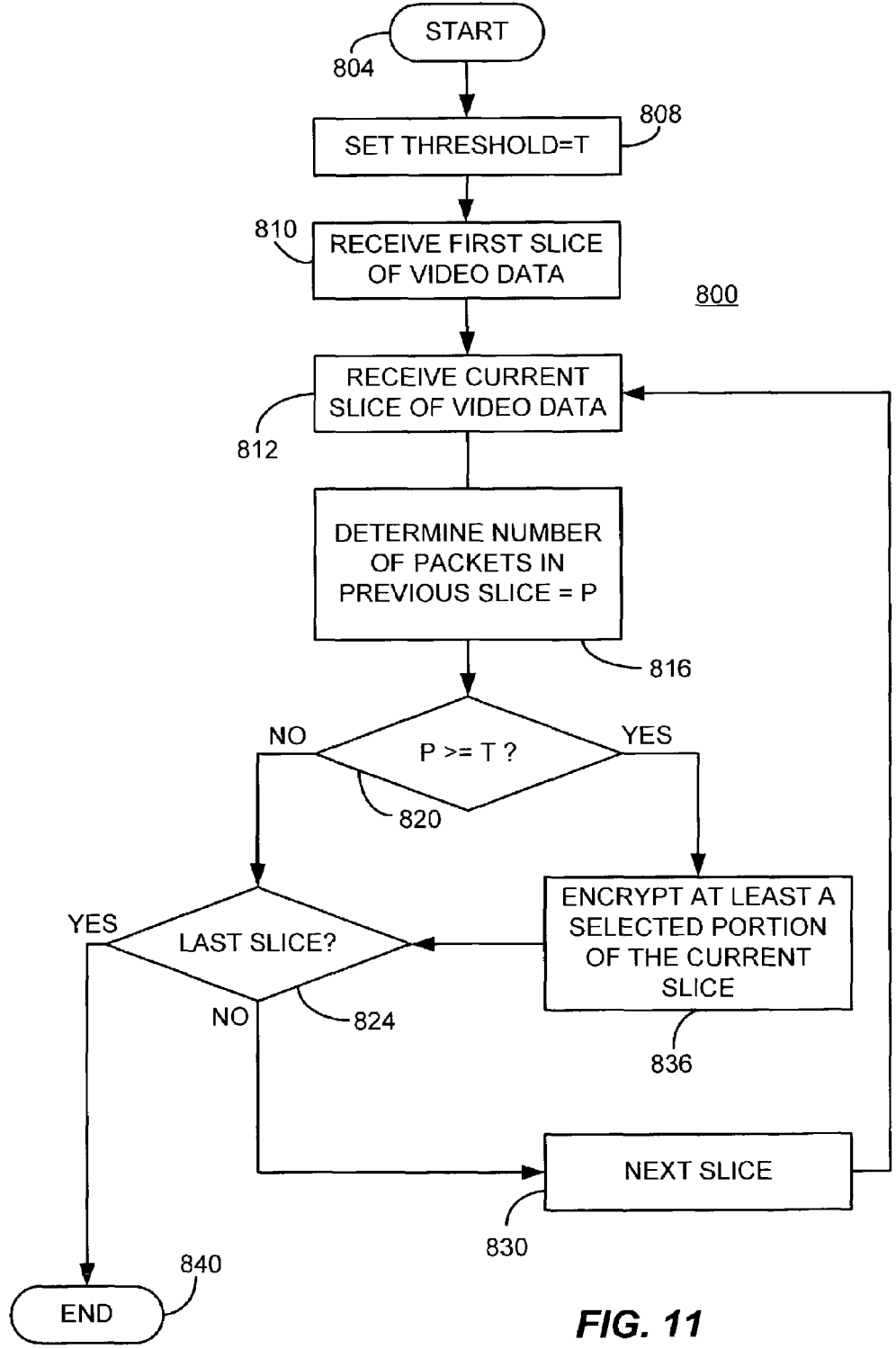
FIG. 11 is a flow chart depicting another packet count based scene change detection process used in conjunction with an encryption process consistent with certain embodiments of the present invention.

In a similar manner, a process wherein a previous slice is used to determine whether or not to encrypt a current slice is depicted as process 800 of FIG. 11 starting at 804. At 808 a threshold T is established as a threshold beyond which a scene change is deemed to have occurred. A first slice is received at 810 and a current slice of video data is received at 812. The size P of the slice prior to the current slice is determined (measured in number of packets) at 816. If the prior slice of video data is not larger in number of packets P than the threshold T at 820, and if it is not the last slice in an image at 824, the process increments to the next slice at 830 and control returns to 812 where a new current slice is retrieved. If the number of packets in the slice P of the prior slice is greater than or equal to the threshold T (or alternatively, simply greater than the threshold) at 820, at least a portion of the slice (e.g., the slice header or all intra-coded data in the slice or the entire slice) is encrypted at 836. The process then proceeds to 824. When the last slice of the video signal has been processed, process 800 ends at 840.

In one exemplary embodiment, it is noted that a slice of video data is generally contained in between about three and eleven packets of video data. By observation of the amount of data that constitutes a scene change, a threshold of approximately seven packets can be established empirically and refined. Thus, it can be deemed that any slice carrying more than this threshold contains data representing a scene change. This slice, and/or the following slice can be encrypted to provide partial encryption of the video image. Since scene changes are a relatively infrequent occurrence in a stream of video data, it generally represents a rather small (but content dependent) percentage of the overall data. Encryption of such data, therefore, represents a very small percentage of overhead when used in a multiple encryption environment.

Those skilled in the art will also appreciate that the processes 700 and 800 can be combined so that both the current slice and the prior slice are encrypted if the prior slice is greater in size than the threshold. It should be noted for purposes of this discussion, that encryption of a slice of video information can be accomplished in many ways. In one example, all data in the slice can be encrypted. In another example, the slice header for a slice can be encrypted rendering the remaining data in the slice useless and thus for practical purposes (and purposes of this document) also encrypted. Additionally, by encryption of intra-coded macroblocks in a slice the slice can be effectively rendered encrypted. Other possibilities may also exist consistent with embodiments of the present invention.

Multiple combinations of the encryption techniques are possible to produce encryption that has varying bandwidth requirements, varying levels of security and varying complexity. Such encryption techniques can be selected by control computer 118 in accordance with the needs of the MSO. The above-described encryption techniques can provide several additional choices to enrich a pallette of encryption techniques that can thus be selected by control computer 118 to vary the encryption making hacking more difficult.

Numerous other combinations of the above encryption techniques as well as those described in the above-referenced patent applications and other partial encryption techniques can be combined to produce a rich pallette of encryption techniques from which to select. In accordance with certain embodiments of the present invention, a selection of packets to encrypt can be made by the control computer 118 in order to balance encryption security with bandwidth and in order to shift the encryption technique from time to time to thwart hackers.

While the above embodiments describe encryption of packets containing the selected data type, it is also possible to encrypt the raw data prior to packetizing without departing from this invention and such encryption is considered equivalent thereto.

Figure 12:
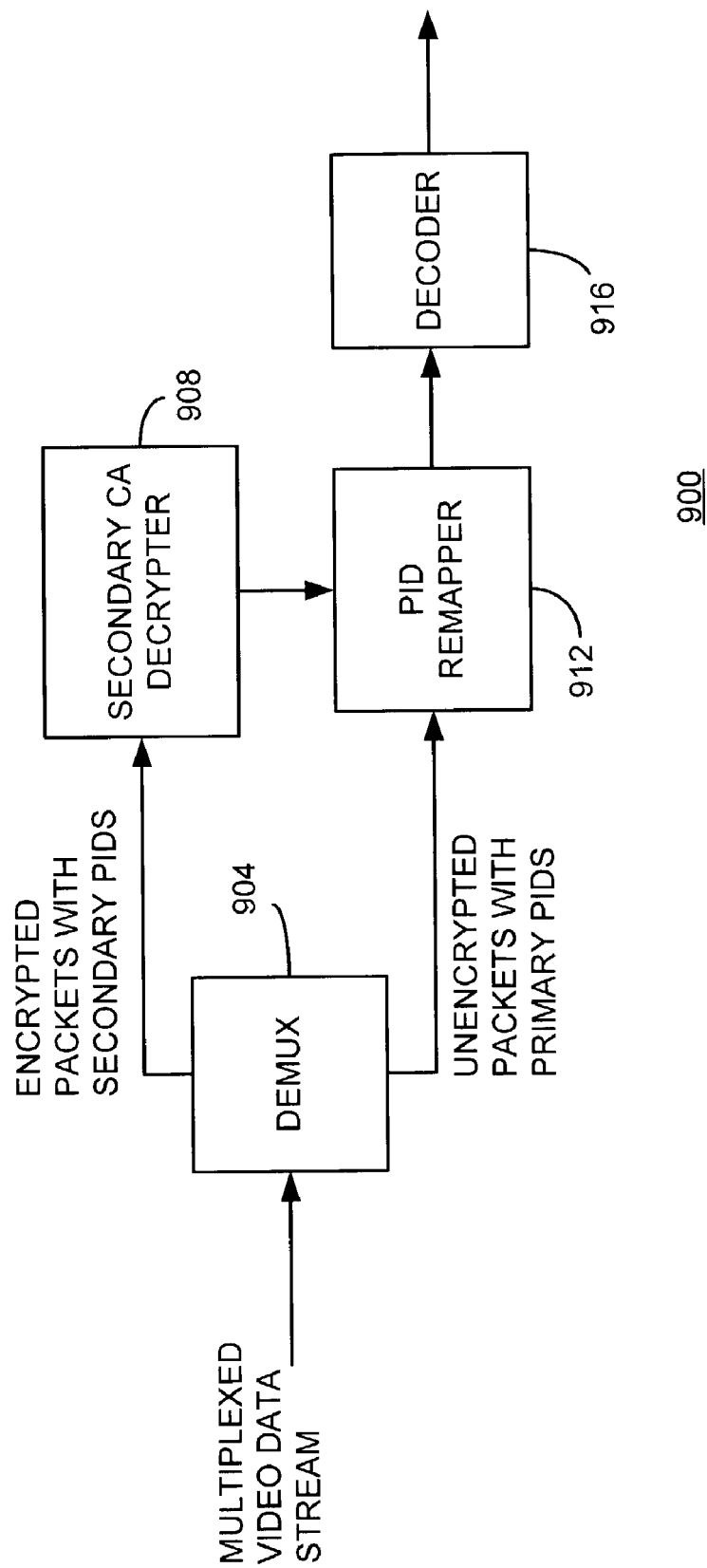
FIG. 12 illustrates a television Set-top box that decrypts and decodes in a manner consistent with certain embodiments of the present invention.

An authorized set-top box such as 900 illustrated in FIG. 12 operating under the secondary CA system decrypts and decodes the incoming program by recognizing both primary and secondary PIDs associated with a single program. The multiplexed video data stream containing both PIDs is directed to a demultiplexer 904. When a program is received that contains encrypted content that was encrypted by any of the above techniques, the demultiplexer directs encrypted packets containing encrypted content and secondary PIDS to a secondary CA decrypter 908. These packets are then decrypted at 908 and passed to a PID remapper 912. As illustrated, the PID remapper 912 receives packets that are unencrypted and bear the primary PID as well as the decrypted packets having the secondary PID. The PID remapper 912 combines the decrypted packets from decrypter 908 with the unencrypted packets having the primary PID to produce an unencrypted data stream representing the desired program. PID remapping is used to change either the primary or secondary PID or both to a single PID. This unencrypted data stream can then be decoded normally by decoder 916. Some or all of the components depicted in FIG. 12 can be implemented and/or controlled as program code running on a programmed processor, with the code being stored on an electronic storage medium.

Figure 13:
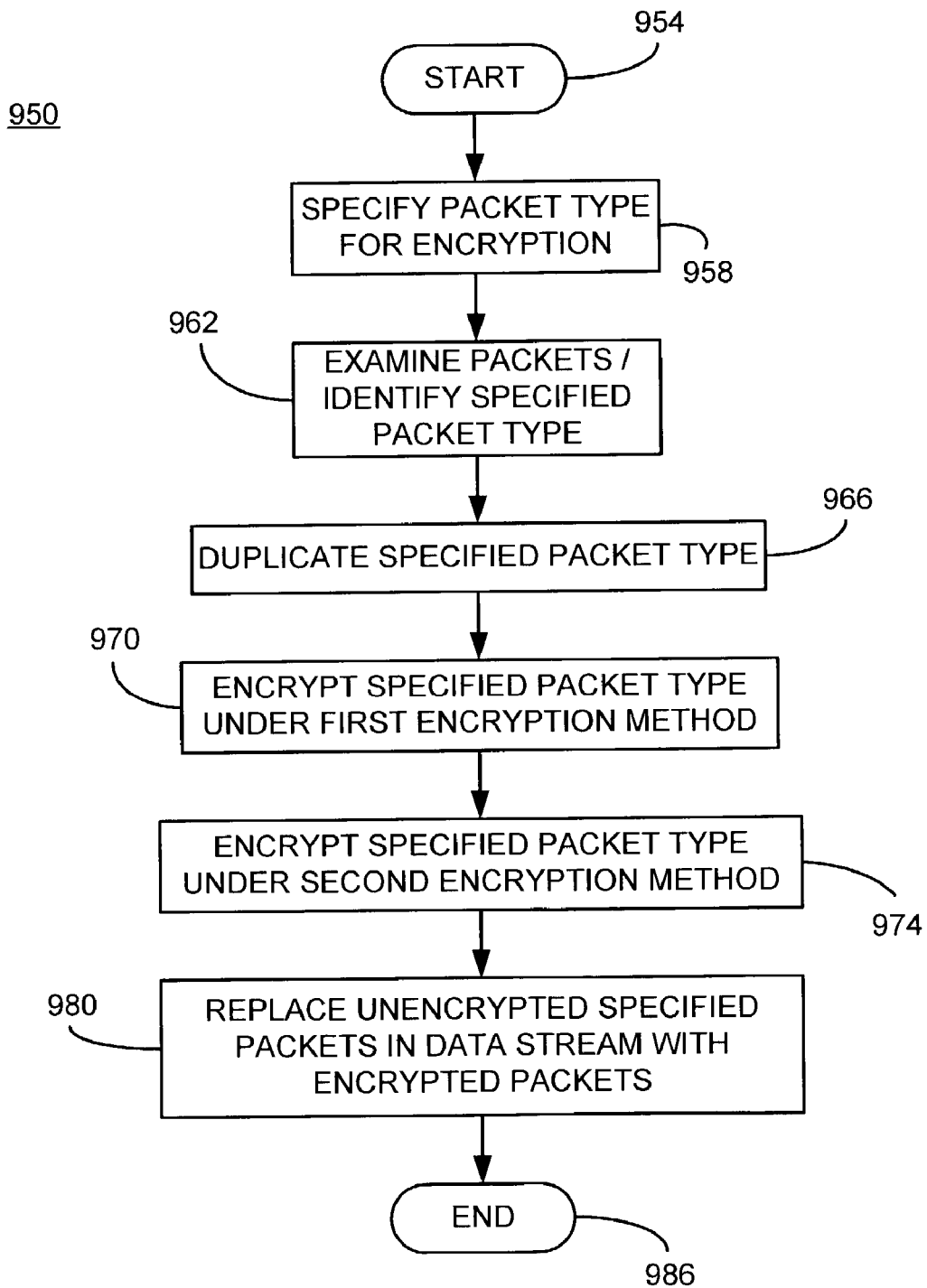
FIG. 13 is a flow chart broadly illustrating an encryption process consistent with embodiments of the present invention.

FIG. 13 is a flow chart 950 that broadly illustrates the encryption process consistent with certain embodiments of the present invention starting at 954. At 958 the packet type that is to be encrypted is specified. In accordance with certain embodiments consistent with the present invention, the selected packet type may be any packet containing data that represents a first image after a scene change. Packets are then examined at 962 to identify packets of the specified type. At 966, the identified packets are duplicated and at 970 one set of these packets is encrypted under a first encryption method. The other set of identified packets is encrypted at 974 under a second encryption method. The originally identified packets are then replaced in the data stream with the two sets of encrypted packets at 980 and the process ends at 986.

While the above embodiments describe encryption of packets containing the selected data type, it is also possible to encrypt the raw data prior to packetizing without departing from this invention and such encryption is considered equivalent thereto.

Those skilled in the art will recognize that the present invention has been described in terms of exemplary embodiments based upon use of a programmed processor (e.g., processor 118, processors implementing any or all of the elements of 114 or implementing any or all of the elements of 900). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of partially dual encrypting a digital video signal, comprising:

examining unencrypted packets of data in the digital video signal to identify a specified packet type, the specified packet type comprising packets carrying data representing a video slice wherein the video slice contains a larger amount of data than a threshold amount of data;

encrypting packets identified as being of the specified packet type using a first encryption method to produce first encrypted packets;

encrypting the packets identified as being of the specified packet type using a second encryption method to produce second encrypted packets;

wherein, the first and second encrypted packets contain the same data when unencrypted; and replacing the unencrypted packets of the specified packet type with the first encrypted packets and the second encrypted packets in the digital video signal to produce a partially dual encrypted video signal.

2. The method according to claim 1, wherein determining if the slice contains a greater amount of data than the threshold amount of data comprises counting a number of packets carrying the slice and determining if the number of packets is greater than a threshold number of packets.

3. The method according to claim 1, wherein determining if the slice contains a greater amount of data than the threshold amount of data comprises counting a number of intra-coded macroblocks in the slice and determining if the number of intra-coded macroblocks is greater than a threshold number of intra-coded macroblocks.

4. A tangible computer readable storage medium storing instructions which, when executed on a programmed processor, carry out the method of encrypting a digital video signal according to claim 1.

5. The tangible computer readable storage medium of claim 4, wherein the medium comprises an electronic storage medium.

6. A method of partially encrypting a digital video signal, comprising:

examining unencrypted packets of data in the digital video signal to identify a specified packet type, the specified packet type comprising packets carrying data representing a video slice wherein the video slice contains a larger amount of data than a threshold amount of data;

encrypting packets identified as being of the specified packet type using a first encryption method to produce first encrypted packets; and replacing the unencrypted packets of the specified packet type with the first encrypted packets in the digital video signal to produce a partially encrypted video signal.

7. The method according to claim 6, wherein determining if the slice contains a greater amount of data than the threshold amount of data comprises counting a number of packets carrying the slice and determining if the number of packets is greater than a threshold number of packets.

8. The method according to claim 7, wherein determining if the slice contains a greater amount of data than the threshold amount of data comprises counting a number of intra-coded macroblocks in the slice and determining if the number of intra-coded macroblocks is greater than a threshold number of intra-coded macroblocks.

9. A tangible computer readable storage medium storing instructions which, when executed on a programmed processor, carry out the method of encrypting a digital video signal according to claim 6.

10. The tangible computer readable storage medium of claim 9, wherein the tangible computer readable storage medium comprises an electronic storage medium.

11. A method of partially dual encrypting a digital video signal, comprising:

examining unencrypted packets of data in the digital video signal to identify a specified packet type, the specified packet type comprising packets carrying data representing a video slice wherein a preceding video slice contains a larger amount of data than a threshold amount of data;

encrypting packets identified as being of the specified packet type using a first encryption method to produce first encrypted packets;

encrypting the packets identified as being of the specified packet type using a second encryption method to produce second encrypted packets;

wherein, the first and second encrypted packets contain the same data when unencrypted; and replacing the unencrypted packets of the specified packet type with the first encrypted packets and the second encrypted packets in the digital video signal to produce a partially dual encrypted video signal.

12. The method according to claim 11, wherein determining if a preceding slice contains a greater amount of data than the threshold amount of data comprises counting a number of packets carrying the slice and determining if the number of packets is greater than a threshold number of packets.

13. The method according to claim 11, wherein determining if a preceding slice contains a greater amount of data than the threshold amount of data comprises counting a number of intra-coded macroblocks in the slice and determining if the number of intra-coded macroblocks is greater than a threshold number of intra-coded macroblocks.

14. A tangible computer readable storage medium storing instructions which, when executed on a programmed processor, carry out the method of encrypting a digital video signal according to claim 11.

15. The tangible computer readable medium of claim 14, wherein the medium comprises an electronic storage medium.

16. A method of partially encrypting a digital video signal, comprising:

examining unencrypted packets of data in the digital video signal to identify a specified packet type, the specified packet type comprising packets carrying data representing a video slice wherein a preceding video slice contains a larger amount of data than a threshold amount of data;

encrypting packets identified as being of the specified packet type using a first encryption method to produce first encrypted packets; and replacing the unencrypted packets of the specified packet type with the first encrypted packets in the digital video signal to produce a partially encrypted video signal.

17. The method according to claim 16, wherein determining if the preceding slice contains a greater amount of data than the threshold amount of data comprises counting a number of packets carrying the slice and determining if the number of packets is greater than a threshold number of packets.

18. The method according to claim 16, wherein determining if the preceding slice contains a greater amount of data than the threshold amount of data comprises counting a number of intra-coded macroblocks in the slice and determining if the number of intra-coded macroblocks is greater than a threshold number of intra-coded macroblocks.

19. A tangible computer readable storage medium storing instructions which, when executed on a programmed processor, carry out the method of encrypting a digital video signal according to claim 16.

20. The tangible computer readable storage medium of claim 19, wherein the medium comprises an electronic storage medium.

21. A method of partially encrypting a digital video signal, comprising:
  examining unencrypted packets of data in the digital video signal to identify a specified packet type, the specified packet type comprising packets carrying data representing a video slice header for a video slice that contains a larger amount of data than a threshold amount of data;
  encrypting packets identified as being of the specified packet type using a first encryption method to produce first encrypted packets; and
  replacing the unencrypted packets of the specified packet type with the first encrypted packets in the digital video signal to produce a partially encrypted video signal.

22. The method according to claim 21, wherein determining if the slice contains a greater amount of data than the threshold amount of data comprises counting a number of packets carrying the slice and determining if the number of packets is greater than a threshold number of packets.

23. The method according to claim 21, wherein determining if the slice contains a greater amount of data than the threshold amount of data comprises counting a number of intra-coded macroblocks in the slice and determining if the number of intra-coded macroblocks is greater than a threshold number of intra-coded macroblocks.

24. A tangible computer readable storage medium storing instructions which, when executed on a programmed processor, carry out the method of encrypting a digital video signal according to claim 21.

25. The tangible computer readable storage medium of claim 24, wherein the medium comprises an electronic storage medium.

26. A method of partially dual encrypting a digital video signal, comprising:
  examining unencrypted packets of data in the digital video signal to identify a specified packet type, the specified packet type comprising packets carrying data representing a video slice header for a slice following a preceding video slice that contains a larger amount of data than a threshold amount of data;
  encrypting packets identified as being of the specified packet type using a first encryption method to produce first encrypted packets;
  encrypting the packets identified as being of the specified packet type using a second encryption method to produce second encrypted packets;
  wherein, the first and second encrypted packets contain the same data when unencrypted; and
  replacing the unencrypted packets of the specified packet type with the first encrypted packets and the second encrypted packets in the digital video signal to produce a partially dual encrypted video signal.

27. The method according to claim 26, wherein determining if a preceding slice contains a greater amount of data than the threshold amount of data comprises counting a number of packets carrying the slice and determining if the number of packets is greater than a threshold number of packets.

28. The method according to claim 26, wherein determining if a preceding slice contains a greater amount of data than the threshold amount of data comprises counting a number of intra-coded macroblocks in the slice and determining if the number of intra-coded macroblocks is greater than a threshold number of intra-coded macroblocks.

29. A tangible computer readable storage medium storing instructions which, when executed on a programmed processor, carry out the method of encrypting a digital video signal according to claim 26.

30. The tangible computer readable storage medium of claim 29, wherein the medium comprises an electronic storage medium.

31. A method of partially encrypting a digital video signal, comprising:
  examining unencrypted packets of data in the digital video signal to identify a specified packet type, the specified packet type comprising packets carrying data representing a video slice header for a slice following a preceding video slice that contains a larger amount of data than a threshold amount of data;
  encrypting packets identified as being of the specified packet type using a first encryption method to produce first encrypted packets; and
  replacing the unencrypted packets of the specified packet type with the first encrypted packets in the digital video signal to produce a partially encrypted video signal.

32. A method according to claim 31, wherein determining if the preceding slice contains a greater amount of data than the threshold amount of data comprises counting a number of packets carrying the slice and determining if the number of packets is greater than a threshold number of packets.

33. The method according to claim 31, wherein determining if the preceding slice contains a greater amount of data than the threshold amount of data comprises counting a number of intra-coded macroblocks in the slice and determining if the number of intra-coded macroblocks is greater than a threshold number of intra-coded macroblocks.

34. A tangible computer readable storage medium storing instructions which, when executed on a programmed processor, carry out the method of encrypting a digital video signal according to claim 31.

35. The tangible computer readable storage medium of claim 34, wherein the medium comprises an electronic storage medium.

* * * * *